Sept. 11, 1923.
L. S. DOWNS ET AL
TIRE VALVE
Filed July 31, 1922
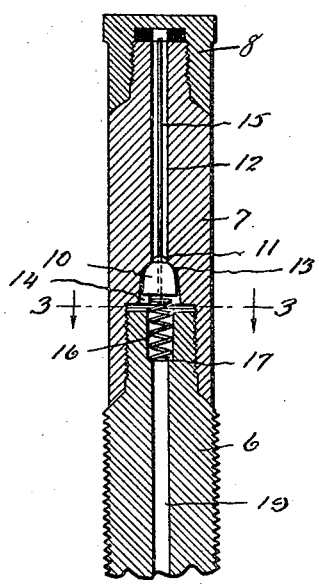
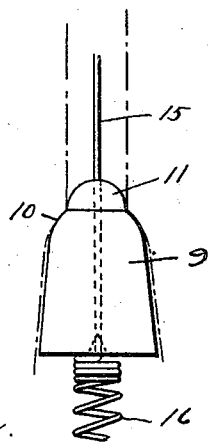
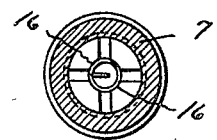
Inventors
L. S. Downs
Geo. Heckling
By John A. Bommhardt
Atty.

Patented Sept. 11, 1923.

1,467,780

UNITED STATES PATENT OFFICE.

LINCOLN S. DOWNS, OF EAST CLEVELAND, AND GEORGE HECKLING, OF CLEVELAND, OHIO.

TIRE VALVE.

Application filed July 31, 1922. Serial No. 578,605.

*To all whom it may concern:*

Be it known that we, LINCOLN S. DOWNS and GEORGE HECKLING, citizens of the United States, residing at East Cleveland and Cleveland, respectively, in the county of Cuyahoga and State of Ohio, have invented certain new and useful Improvements in Tire Valves, of which the following is a specification.

This invention relates to valves of the type particularly used on tires, the purpose being to simplify and cheapen the construction of such valves and to provide a valve which will be secure against leakage. The device is in some respects a modification of the tire valve shown in the pending application of Elliott and Rupp Serial No. 536,059, but is attended with certain advantages as will be more fully apparent from the following description and the accompanying drawings.

In the drawings, Figure 1 is a longitudinal section of the valve and stem. Fig. 2 is an elevation of the valve itself. Fig. 3 is a section on the line 3—3 of Fig. 1.

Referring specifically to the drawings, 6 indicates the valve stem and 7 an extra piece or extension screwed thereon, and provided with a cap 8, as described in said pending application of Elliott and Rupp. The sections 6 and 7 have the usual central bores which register when the outer section 7 is screwed on the stem.

The valve is located between the sections, and comprises a tapered plug 9 which is curved at the outer end as indicated at 10 and is further provided with a centering teat or projection 11 which is of proper size to fit with a close or wedging contact within the bore 12 in the member 7. The curved surface 10 of the plug also seats against a corresponding curved surface 13 at the end of a cup-shaped recess 14 produced in the end of the section 7. Accordingly a double seal is effected, one by the plugging action of the teat 11 in the bore 12 and the other by the seating surface 10 in the cupped recess.

The plug so constructed is mounted on a combined valve stem and spring, consisting of a piece of wire having a straight part 15 which extends in the bore 12, and a coiled part 16 which is located in a recess 17 in the end of the member 6.

The plug is preferably made of rubber or similar material. The combined stem and spring on which it is carried is made of a piece of wire as stated, coiled to form the spring, and when the parts are assembled the spring section presses against the plug and tends to force the valve to its seat, this action being assisted by any pressure in the tire. The valve may be easily renewed by unscrewing the outer part 7. The stem 15 projects a sufficient distance so that when a supply nipple is connected as usual the valve will be pressed in or unseated, during inflation.

It is obvious that the valve, proper, may be very cheaply made. The stem and spring can be bent up of a single piece of wire, the straight portion being then fitted through a hole in the plug made for that purpose. As the valve closes the projection 11 centers the same with respect to the valve seat and insures a close contact of the plug all around the seat, and with a wide contacting surface which makes it secure against leakage.

What we claim as new is:

1. A valve comprising a stem and a spring integral therewith, and a plug fitting on the stem and adapted to be advanced to its seat by the spring.

2. A valve comprising a straight piece of wire forming the stem, and coiled to form a spring near one end thereof, and a plug fitting on the stem.

3. The combination with a tube having a bore and a cup-shaped seat at the end thereof, of a valve comprising a rubber plug having a segmental seating surface which closes against said seat and also having a central teat at its seating end which enters the bore at a close fit when the plug is seated.

In testimony whereof, we do affix our signatures in presence of two witnesses.

LINCOLN S. DOWNS.
GEORGE HECKLING.

Witnesses:
JOHN A. BOMMHARDT,
EDWARD J. HOBDAY.